United States Patent
Zeng et al.

(10) Patent No.: US 11,579,091 B2
(45) Date of Patent: Feb. 14, 2023

(54) NON-CONTACT SPATIAL SUPER-RESOLUTION COHERENT RAMAN SPECTROMETRIC IMAGING METHOD

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Tianjian Lv, Chongqing (CN); Ming Yan, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 17/528,271

(22) Filed: Nov. 17, 2021

(65) Prior Publication Data

US 2022/0155233 A1 May 19, 2022

(30) Foreign Application Priority Data

Nov. 17, 2020 (CN) .......................... 202011281924.5

(51) Int. Cl.
*G01J 3/44* (2006.01)
*G01N 21/65* (2006.01)

(52) U.S. Cl.
CPC ....... *G01N 21/65* (2013.01); *G01N 2021/653* (2013.01)

(58) Field of Classification Search
CPC ..... G01N 21/65; G01N 2021/653; G01J 3/44; A61B 5/0075; G02B 21/0076; G02B 27/58
See application file for complete search history.

(56) References Cited

U.S. PATENT DOCUMENTS 8,681,331 B2 * 3/2014 Xie .................. G01N 21/53
356/342
2013/0162994 A1 * 6/2013 Xie .................. G01N 21/636
356/342

* cited by examiner

*Primary Examiner* — Abdullahi Nur
(74) *Attorney, Agent, or Firm* — Hodgson Russ LLP

(57) ABSTRACT

A Raman spectrometric imaging method, including: placing a sample on a two-dimensional translation stage; emitting a first light beam by a first optical comb light source; dividing the first light beam into a pump light beam and a depletion light beam to illuminate the sample; guiding the pump light beam to illuminate a region of the sample to excite molecules of the sample in the region; guiding the depletion light beam to the region of the sample to make excited molecules at a periphery of the region to return into a vibrational ground state; emitting a second light beam as a probe light beam by a second optical comb light source to the remaining excited molecules to generate a CARS signal; recording the CARS signal for imaging; moving the two-dimensional translation stage to scan other regions of the sample to form an image of the sample.

10 Claims, 2 Drawing Sheets

NON-CONTACT SPATIAL SUPER-RESOLUTION COHERENT RAMAN SPECTROMETRIC IMAGING METHOD

CROSS-REFERENCE TO RELATED APPLICATION

This application claims priority to, and the benefits of, Chinese Patent Application Serial No. 202011281924.5, filed on Nov. 17, 2020, the entire content of which is incorporated herein by reference.

FIELD

The present disclosure relates to a technical field of Raman spectrometric measurements, and specifically relates to a non-contact spatial super-resolution coherent Raman spectrometric imaging method.

BACKGROUND

Coherent Raman spectroscopy and imaging technology are applied to realize identification and qualitative and quantitative analysis of a target material by measuring Raman characteristic lines (fingerprint spectra) of molecules (or chemical bonds). However, for a complex molecular system (such as a biological cell and DNA), the distribution of fingerprint peaks of molecules or chemical bonds is intricate, and intermolecular interactions or environmental effects may cause peak shifts. It is difficult to accurately determine type, state and dynamic process of a sample through a single fingerprint peak measurement.

It is also known that a spatial resolution of Raman imaging affects its application in chemistry, biomedicine and other fields. The existing spatial super-resolution imaging relies on a fluorescent labeling method and a surface-enhanced Raman technology. The fluorescent labeling method has a limited application range and cannot provide broadband molecular characteristic spectral information. The surface-enhanced Raman technology is applied under the condition that the probe is in contact with the sample surface, which increases the difficulty of sample preparation, and thus limits its application in biomedical field.

SUMMARY

The present disclosure provides in embodiments a Raman spectrometric imaging method. The method includes: placing a sample on a two-dimensional translation stage; emitting a first light beam by a first optical comb light source; dividing the first light beam into a pump light beam and a depletion light beam to illuminate the sample, wherein the depletion light beam is shaped into an annular beam and delayed for a time less than 10 ps with respect to the pump light beam to reach the sample; guiding the pump light beam to illuminate a region of the sample to excite molecules of the sample in the region; guiding the depletion light beam to the region of the sample to make excited molecules at a periphery of the region to return into a vibrational ground state; emitting a second light beam as a probe light beam by a second optical comb light source to the remaining excited molecules to generate a coherent anti-Stokes Raman scattering (CARS) signal, wherein the first and second optical comb light sources have a pulse width in a range of 1 fs to 100 fs, the first optical comb light source has a first repetition frequency and the second optical comb light source has a second repetition frequency being different from the first repetition frequency; recording the CARS signal for imaging; and moving the two-dimensional translation stage to scan other regions of the sample to form an image of the sample.

In some embodiments, a difference between the first repetition frequency and the second repetition frequency is less than 1 kHz.

In some embodiments, the first optical comb light source has the first repetition frequency of 100 MHz, and the second optical comb light source has the second repetition frequency of 100 MHz+10 Hz.

In some embodiments, the first repetition frequency and the second repetition frequency have a pulse width of 10 fs.

In some embodiments, the depletion light beam is delayed with respect to the pump light beam by extending an optical path for the depletion light beam.

In some embodiments, extending an optical path for the depletion light beam includes: providing a delay device consisting of two reflectors and a one-dimensional translation stage.

In some embodiments, the depletion light beam is delayed for a time of 1 ps with respect to the pump light beam.

In some embodiments, a time delay between the pump light beam and the probe light beam is represented by $N \cdot \Delta f / fr^2$, where N represents the number of pulse pairs, fr represents the first repetition frequency of the first optical comb light source, and $\Delta f$ represents a difference between the first repetition frequency and the second repetition frequency.

In some embodiments, before recording the CARS signal, the method further includes: emitting a local oscillator light beam by a third optical comb light source to increase an amplitude of the CARS signal.

In some embodiments, the third optical comb light source has a repetition frequency of 100 MHz+20 Hz, and a pulse width of 10 fs.

Figure 1:
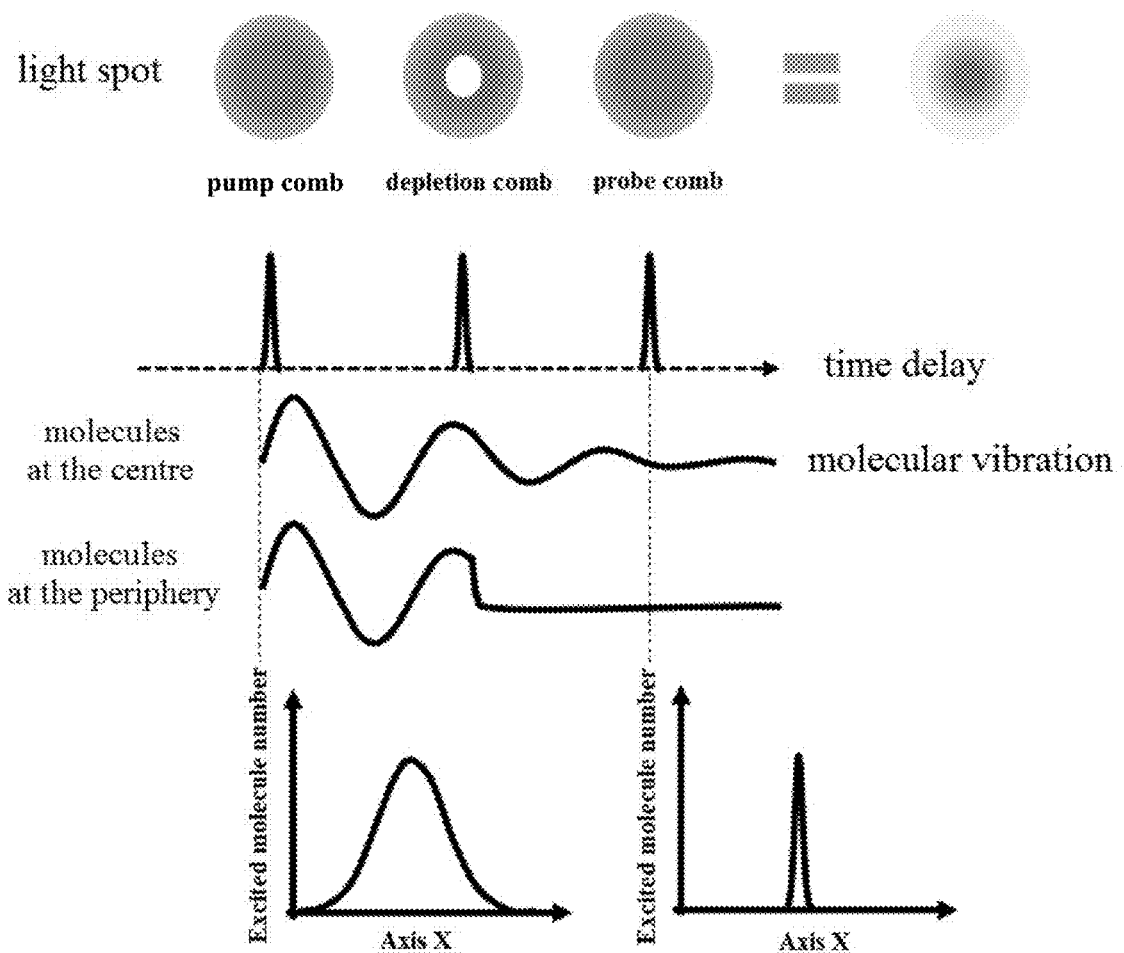
FIG. 1 is a schematic diagram shows a "pump-deplete-probe" measurement of a multiple-pulse coherent Raman spectroscopy according to an embodiment of the present disclosure.

REFERENCE NUMERALS first optical comb light source 101, second optical comb light source 102, third optical comb light source 103, first beam splitter 201, first reflector 202, phase plate 203, delay device 204, second reflector 205, second beam splitter 206, third reflector 207, third beam splitter 208, dichroic mirror 209, first lens 210, sample 211, short-pass filter 212, second lens 213, avalanche photodiode detector 214, fourth beam splitter 215.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

Embodiments of the present disclosure seek to solve at least one of the problems existing in the related art to at least some extent.

Accordingly, the present disclosure provides a non-contact spatial super-resolution coherent Raman spectrometric imaging method. Three light beams, i.e., a pump light beam, a depletion light beam, and a probe light beam are provided to excite a sample to generate a signal presenting information of a target area of the sample, and this target area is smaller than the region illuminated by the pump light beam, thus achieving a super resolution (a spatial resolution is always limited by the optical diffraction effect). This spatial super-resolution in imaging is further combined with a broadband coherent Raman spectroscopy by using ultrashort pulses to perform the coherent Raman process. Therefore, the present method can realize the non-contact super-resolution coherent Raman spectroscopy imaging of the sample surface.

The present disclosure provides a non-contact spatial super-resolution coherent Raman spectrometric imaging method. A first and second femtosecond optical combs are provided as a light source, and a difference in repetition frequency between the first optical comb and the second optical comb is less than 1 kHz. Light provided by the first optical comb is divided into a pump light and a depletion light, and with respect to the pump light, the depletion light delays a time t. Light provided by the second optical comb is used as a probe light. The depletion light passes through a phase plate to form an annulus-shaped light spot. The three light beams are collinear and focused on a surface of a sample to be tested through a microscope objective lens. A "pump-deplete-probe" measurement is used to produce a light spot that breaks the optical diffraction limit to illuminate the sample. The coherent Raman process is used to produce a blue-shifted anti-Stokes light. A dual-comb "pump-probe" Raman technology is used to achieve a rapid measurement of the coherent Raman spectroscopy. A point scanning is used to achieve super-resolution detection for the surface of the sample.

The femtosecond combs used as the light source in the present disclosure refer to a femtosecond mode-locked pulse light source, and a pulse repetition frequency thereof is precisely controlled (a precision is in a range of 1 Hz to 1 MHz). A full width (comb) of a spectral width of the light source determines a measurable spectral width of a coherent Raman signal (Raman=comb). The smaller the pulse width ($\Delta W$) is, the wider the full width is, and the wider a measurable Raman spectrum range is. For example, for a Gaussian pulse, comb=$2\times 0.44/(\Delta W \cdot c)$, where c represents a speed of light in vacuum. It is known that 1 fs=$10^{-15}$ s.

During the "pump-deplete-probe" measurement, the three light beams are focused on the surface of the sample. Molecules of the sample are excited by the pump light pulse to cause the Raman transition. A time interval t later, the annulus-shaped depletion light pulse makes molecules at a periphery of a region where is illuminated by the excitation light return to the vibrational ground state through a multiphoton resonance. After illumination of the depletion light, the probe light illuminates the same region of the surface of the sample, and the probe light pulse is only interacted with molecules (have a high vibration energy level) in the center (not illuminated by the depletion light) of the region where is illuminated by the excitation light, to produce an anti-Stokes light signal. This signal representing information of an area obtained by subtracting the annular area (like a doughnut) where is illuminated by the depletion light from the region where is illuminated by the pump light. The spots on the surface of the sample formed by the pump light beam, the depletion light beam and the probe light beam are shown in FIG. 1. The pump light spot (focused by the microscope system), i.e., the region where is illuminated by the pump light, reaches the diffraction limit. After subtracting the depletion annular area, the remaining spot (i.e., the center area) is a super-resolution spot that breaks through the optical diffraction limit. The time interval t is less than an energy level lifetime of a high-energy vibrational state of a molecule, for example is less than or equal to 10 ps.

Figure 2:
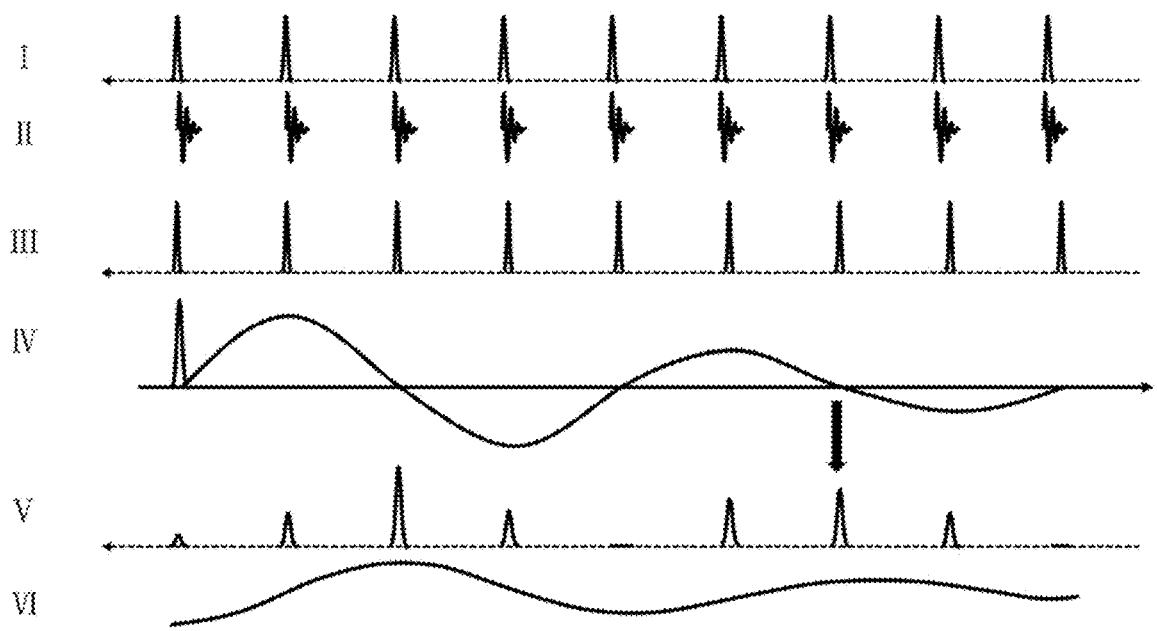
FIG. 2 is a schematic diagram of a dual-comb "pump-probe" Raman technology according to an embodiment of the present disclosure.
Figure 3:
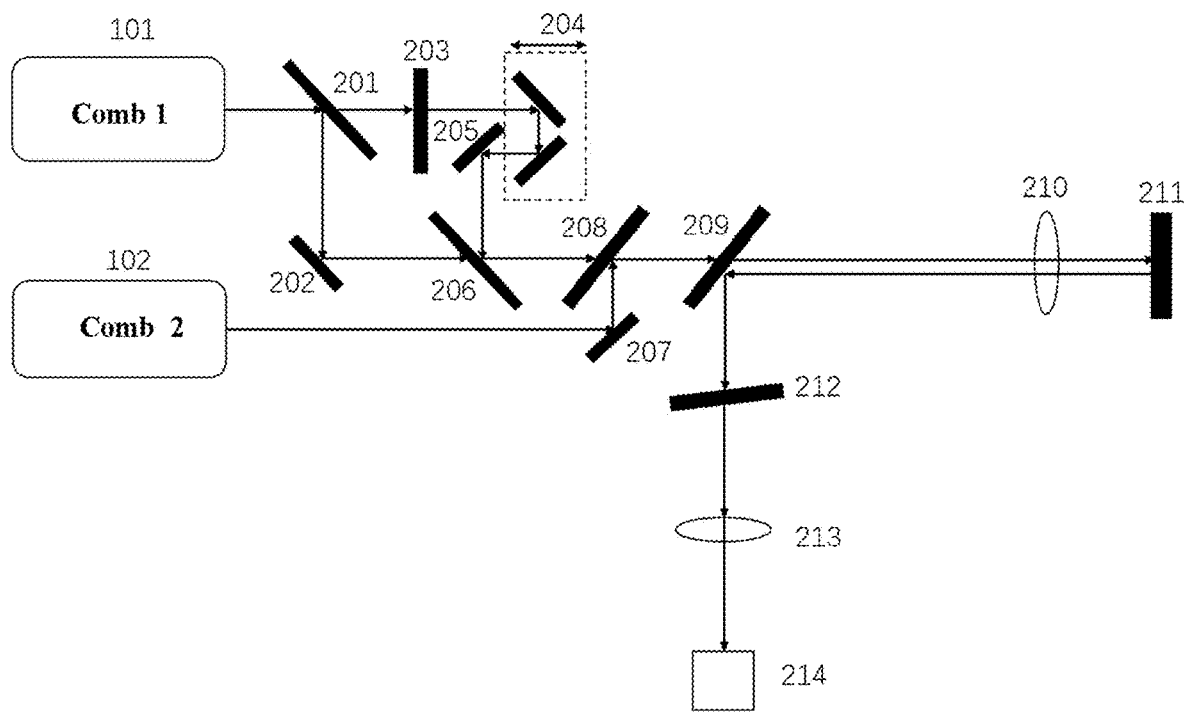
FIG. 3 is a schematic diagram of a Raman spectrometric imaging system of Example 1 of the present disclosure.
Figure 4:
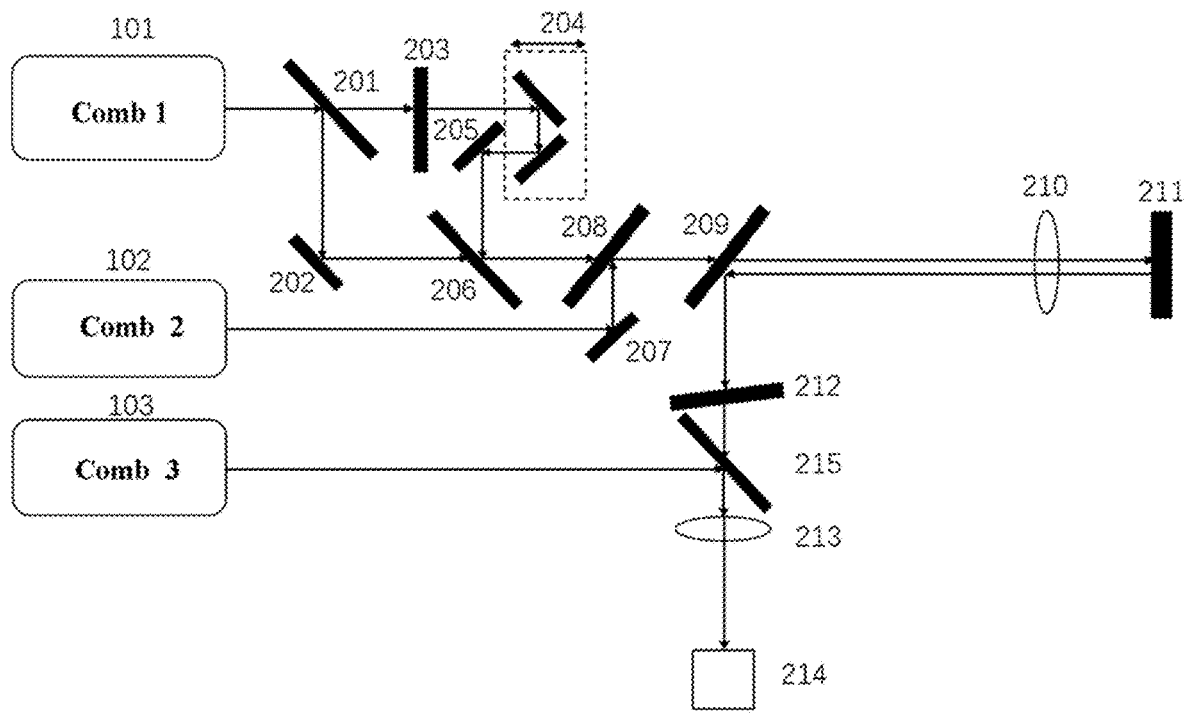
FIG. 4 is a schematic diagram of a Raman spectrometric imaging system of Example 2 of the present disclosure.

FIG. 2 shows the dual-comb "pump-probe" Raman technology used in the present disclosure. Two optical combs are used for this technology, for example the first optical comb providing a pump light pulse (shown in FIG. 2, line I) and the second optical comb providing a probe light pulse (shown in FIG. 2, line III). The first optical comb has a repetition frequency of fr and the second optical comb has a repetition frequency of fr+$\Delta f$, that is $\Delta f$ represents a repetition frequency difference between the first optical comb and the second optical comb. The repetition frequency difference $\Delta f$ is less than 1 kHz. A time delay between the pump light beam and the probe light beam is $N \cdot \Delta f/fr^2$, where N represents the number of pulse pairs. The pump optical comb excites the molecules of the sample to cause the Raman vibrational transition (with a transition frequency fvib) through a two-photon process (shown in FIG. 2, line II). The vibration of the molecules leads to a change in the refractive index of the sample (shown in FIG. 2, line IV). The probe light pulse is used to sense the frequency change of the sample, and a frequency shift occurs due to the Doppler effect. In this case, a red-shift may cause a coherent Stokes Raman scattering (CSRS) signal, and a blue shift may cause a coherent anti-Stokes Raman scattering (CARS) signal. The change in the refractive index of the sample leads to modulation of intensities of the CRSR and CARS signals (as shown in FIG. 2, line V), and a modulation frequency f mod meets a formula of f mod=fvib·$\Delta f/fr$. This modulation refers to a periodically changing interference signal in the time domain (as shown in FIG. 2, line VI). The interference signal may be detected by an avalanche photodiode detector and is subjected to a Fourier transform to obtain corresponding molecular energy level spectrum information. A measurement time T for one position of the surface of the sample needs to be greater than one modulation period (i.e., 1/f mod), usually in an order of microseconds. Therefore, this technology can achieve the rapid measurement of the Raman spectrum of molecules of the sample. The measurable coherent Raman spectral range is the full width of the pump light spectrum (in a unit of an optical frequency). On this basis, a spectral resolution is $(1/T) \cdot (fr/\Delta f) \cdot A$, where A is a window function of the Fourier transform. For example, for a trigonometric function window, A=1.78.

During the point scanning, the sample is placed on a two-dimensional translation stage with a precision of a nanometer level, and the translation stage is moved in the two-dimensional plane (for example in a coordinate manner) to realize scanning and imaging the spatial positions of the sample. Information of each position point corresponds to a section of broadband coherent Raman spectrum.

In the present disclosure, the CARS signal is detected and received by any suitable detector, such as a high speed ultra-sensitive detector, e.g., an avalanche photodiode detector, and is recorded by a data acquisition card.

The present disclosure has the following beneficial effects.

Compared with the traditional spatial super-resolution Raman imaging technology, the present disclosure adopts the "pump-deplete-probe" measurement based on ultra-short optical comb pulses, which can realize the spatial super-resolution coherence Raman imaging without the fluorescent label and the probe being contact in the sample.

In the present disclosure, three optical comb pulses are used, i.e., the pump light with the repetition frequency of fr, the depletion light with a delay of t with respect to the pump light, and probe light with a repetition frequency of fr+Δf. The three light pulses work together to excite the sample to generate coherent Raman radiation. The dual-comb "pump-probe" technology realizes the measurement of the radiation spectrum (i.e., recording the Raman energy level of the molecule), and realizes both of the spatial super-resolution imaging and the wideband coherent Raman spectroscopy. Therefore, the present method is suitable for a sample having a variety of components and for recording the spatial information of the sample.

Example 1

A first optical comb light source 101 and a second optical comb light source 102 are two lasers with a center wavelength of 800 nm and a pulse width of 10 fs (a corresponding full width of the Fourier transform limit spectrum, that is, a corresponding Raman spectrum width (which is measurable), of 2942 cm$^{-1}$ or 188 nm (indicated in wavelength)). The first optical comb light source 101 has a repetition frequency of 100 MHz, and the second optical comb light source 102 has a repetition frequency of 100 MHz+10 Hz.

Light generated by the first optical comb light source 101 passes through a first beam splitter 201 and divided into two lights. A first light is reflected by a first reflector 202 as a pump light, and a second light passes through a phase plate 203 to generate an annulus-shaped light beam, and passes through a delay device 204 and a second reflector 205 to delay the depletion light with respect to the pump light. The delay device 204 includes two reflectors and a one-dimensional translation stage. By moving the one-dimensional translation stage, the delay of the depletion light with respect to the pump light is adjusted and controlled. In this case, the delay is 1 ps. Optical paths of the pump light and the depletion light are collinear at a second beam splitter 206.

A probe light generated by the second optical comb light source 102 passes through a third reflector 207 and reaches a third beam splitter 208. The probe light is collinear with the pump light and the depletion light at the third beam splitter 208, that is, the three lights share the same optical path after the third beam splitter 208. The three light beams pass through a first lens 210 in a back detection manner, and focused on a sample 211.

The sample 211 is placed on a two-dimensional translation stage with a precision of a nanometer level. The translation stage is moved in a plane-coordinate system to make spatial positions of the sample scanned, to image the sample. In this operation, a CARS signal generated by the sample (due to the coherent Raman effect) is reflected by a dichroic mirror 209, passes through a short-pass filter 212 having a wavelength of 740 nm and a second lens 213, and is focused on an avalanche photodiode detector 214 for imaging.

Example 2

A first optical comb light source 101 and a second optical comb light source 102 are two lasers with a center wavelength of 800 nm and a pulse width of 10 fs. The first optical comb light source 101 has a repetition frequency of 100 MHz, and the second optical comb light source 102 has a repetition frequency of 100 MHz+10 Hz. A third optical comb light source 103 is a laser with a center wavelength of 700 nm, a pulse width of 10 fs and a repetition frequency of 100 MHz+20 Hz.

Light generated by the first optical comb light source 101 passes through a first beam splitter 201 and divided into two lights. A first light is reflected by a first reflector 202 as a pump light, and a second light passes through a phase plate 203 to generate an annulus-shaped light beam, and passes through a delay device 204 and a second reflector 205 to delay the depletion light with respect to the pump light. The delay device 204 includes two reflectors and a one-dimensional translation stage. By moving the one-dimensional translation stage, the delay of the depletion light with respect to the pump light is adjusted and controlled. In this case, the delay is 1 ps. Optical paths of the pump light and the depletion light are collinear at a second beam splitter 206.

A probe light generated by the second optical comb light source 102 passes through a third reflector 207 and reaches a third beam splitter 208. The probe light is collinear with the pump light and the depletion light at the third beam splitter 208, that is, the three lights share the same optical path after the third beam splitter 208. The three light beams pass through a first lens 210 in a back detection manner, and focused on a sample 211.

The sample 211 is placed on a two-dimensional translation stage with a precision of a nanometer level. The translation stage is moved in a plane-coordinate system to make spatial positions of the sample scanned, to image the sample. In this operation, a CARS signal generated by the sample 211 (due to the coherent Raman effect) is reflected by a dichroic mirror 209, passes through a short-pass filter 212 having a wavelength of 740 nm and reaches a fourth beam splitter 215. A local oscillator light is emitted by the third optical comb light source 103 to the fourth beam splitter 215. The local oscillator signal and the CARS signal share the same optical path after the fourth beam splitter 215, and pass a second lens 213, and then are focused on an avalanche photodiode detector 214 for imaging.

The third optical comb light source 103 is used to increase an amplitude of the CARS signal, thus improving a signal-to-noise ratio to improve the imaging quality.

In addition, terms such as "first" and "second" are used herein for purposes of description and are not intended to indicate or imply relative importance or significance or to imply the number of indicated technical features. Thus, the feature defined with "first" and "second" may include one or more of this feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A Raman spectrometric imaging method, comprising:
placing a sample on a two-dimensional translation stage;
emitting a first light beam by a first optical comb light source;
dividing the first light beam into a pump light beam and a depletion light beam to illuminate the sample, wherein the depletion light beam is shaped into an annular beam and delayed for a time less than 10 ps with respect to the pump light beam to reach the sample;
guiding the pump light beam to illuminate a region of the sample to excite molecules of the sample in the region;
guiding the depletion light beam to the region of the sample to make excited molecules at a periphery of the region to return into a vibrational ground state;
emitting a second light beam as a probe light beam by a second optical comb light source to the remaining excited molecules to generate a coherent anti-Stokes Raman scattering (CARS) signal, wherein the first and second optical comb light sources have a pulse width in a range of 1 fs to 100 fs, the first optical comb light source has a first repetition frequency and the second optical comb light source has a second repetition frequency being different from the first repetition frequency;
recording the CARS signal for imaging; and
moving the two-dimensional translation stage to scan other regions of the sample to form an image of the sample.

2. The Raman spectrometric imaging method according to claim 1, wherein a difference between the first repetition frequency and the second repetition frequency is less than 1 kHz.

3. The Raman spectrometric imaging method according to claim 1, wherein the first optical comb light source has the first repetition frequency of 100 MHz, and the second optical comb light source has the second repetition frequency of 100 MHz+10 Hz.

4. The Raman spectrometric imaging method according to claim 1, wherein the first repetition frequency and the second repetition frequency have a pulse width of 10 fs.

5. The Raman spectrometric imaging method according to claim 1, wherein the depletion light beam is delayed with respect to the pump light beam by extending an optical path for the depletion light beam.

6. The Raman spectrometric imaging method according to claim 1, wherein extending an optical path for the depletion light beam comprises: providing a delay device consisting of two reflectors and a one-dimensional translation stage.

7. The Raman spectrometric imaging method according to claim 1, wherein the depletion light beam is delayed for a time of 1 ps with respect to the pump light beam.

8. The Raman spectrometric imaging method according to claim 1, wherein a time delay between the pump light beam and the probe light beam is represented by $N \cdot \Delta f/fr^2$, where N represents the number of pulse pairs, fr represents the first repetition frequency of the first optical comb light source, and $\Delta f$ represents a difference between the first repetition frequency and the second repetition frequency.

9. The Raman spectrometric imaging method according to claim 1, wherein before recording the CARS signal, the method further comprises:
emitting a local oscillator light beam by a third optical comb light source to increase an amplitude of the CARS signal.

10. The Raman spectrometric imaging method according to claim 9, wherein the third optical comb light source has a repetition frequency of 100 MHz+20 Hz, and a pulse width of 10 fs.

* * * * *